US012570181B2

(12) United States Patent
Rydgård et al.

(10) Patent No.: US 12,570,181 B2
(45) Date of Patent: Mar. 10, 2026

(54) COMPUTER IMPLEMENTED METHOD FOR CONTROLLING ENERGY OR POWER UTILIZATION OF A BATTERY PACK

(71) Applicant: VOLVO TRUCK CORPORATION, Gothenburg (SE)

(72) Inventors: Andreas Rydgård, Gothenburg (SE); Olle Friberg, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 122 days.

(21) Appl. No.: 18/540,159

(22) Filed: Dec. 14, 2023

(65) Prior Publication Data

US 2024/0343158 A1      Oct. 17, 2024

(30) Foreign Application Priority Data

Dec. 19, 2022      (EP) ..................................... 22214656

(51) Int. Cl.
*B60L 58/13*          (2019.01)
*B60L 7/10*          (2006.01)

(52) U.S. Cl.
CPC .................. *B60L 58/13* (2019.02); *B60L 7/10* (2013.01); *B60L 2240/26* (2013.01); *B60L 2240/62* (2013.01); *B60L 2260/54* (2013.01)

(58) Field of Classification Search
CPC ............. B60L 2240/26; B60L 2240/62; B60L 2240/642; B60L 2240/70; B60L 2260/54;
(Continued)

(56) References Cited

U.S. PATENT DOCUMENTS 9,174,633 B2 * 11/2015 Lee ........................ B60W 10/30
9,789,868 B2 * 10/2017 Gibson ................. F02D 41/022
(Continued)

FOREIGN PATENT DOCUMENTS

DE        102018219222 A1      5/2020
WO          20187409 A1      1/2018

OTHER PUBLICATIONS

Extended European Search Report in corresponding European Application No. 22214656.5 dated Jun. 16, 2023 (9 pages).

*Primary Examiner* — Tyler J Lee
(74) *Attorney, Agent, or Firm* — Jeffri A. Kaminski; Venable LLP

(57)          ABSTRACT

A computer system includes a processor device configured to determine vehicle weight of an electric vehicle and altitude data of a predetermined route, determine predictive energy or power utilization of a battery pack of the electric vehicle for the predetermined route including battery pack charging in response to power generation of the battery pack along the predetermined route using a regenerative braking system of the electric vehicle together with the vehicle weight and altitude data, identify a vehicle condition along the predetermined route as belonging to a group of pre-defined vehicle conditions defined as regenerative limiting, in response to identifying a vehicle condition as regenerative limiting, operate the battery pack within an operating window defined by extended predetermined SOC limits, the extended predetermined SOC limits having at least one of the upper limit and lower limit exceeding the corresponding limit of the default predetermined SOC limits.

16 Claims, 4 Drawing Sheets

(58) Field of Classification Search
CPC .. B60L 58/13; B60L 58/15; B60L 7/10; B60L
7/22
See application file for complete search history.

(56) References Cited

U.S. PATENT DOCUMENTS

| | | | | | |
|---|---|---|---|---|---|
| 10,450,979 | B2* | 10/2019 | Gibson | ................. | B60K 6/387 |
| 11,472,397 | B2* | 10/2022 | Symanow | ............... | B60L 50/61 |
| 2013/0297117 | A1* | 11/2013 | Lee | ......................... | B60L 50/16 |
| | | | | | 180/65.265 |
| 2016/0243947 | A1 | 8/2016 | Perkins et al. | | |
| 2016/0257295 | A1* | 9/2016 | Miller | ............... | B60W 50/0097 |
| 2019/0283585 | A1 | 9/2019 | Koebler et al. | | |
| 2019/0366873 | A1 | 12/2019 | Fujitake | | |
| 2023/0094431 | A1* | 3/2023 | Zhao | ......................... | B60L 1/02 |
| | | | | | 701/22 |

* cited by examiner

COMPUTER IMPLEMENTED METHOD FOR CONTROLLING ENERGY OR POWER UTILIZATION OF A BATTERY PACK

TECHNICAL FIELD

The disclosure relates generally to controlling energy or power utilization of a battery pack in a rechargeable energy storage system, RESS, of a vehicle. In particular aspects, the disclosure relates to a computer implemented method for controlling energy or power utilization of a battery pack. The disclosure can be applied in heavy-duty vehicles, such as trucks, buses, and construction equipment. Although the disclosure may be described with respect to a particular vehicle, the disclosure is not restricted to any particular vehicle.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine. In either way, energy storage devices are used to store the energy needed in order to operate the engine for propelling the vehicle. For an electric machine, the energy storage devices may be battery packs or supercapacitors, comprised in a rechargeable energy storage system, RESS. Both fully electrically operated vehicles and hybrid vehicles may be referred to as electric vehicles.

In an electric vehicle, the electric machine is part of a powertrain which transform energy from the energy storage system to the propelling means, typically the wheels of the vehicle. For this purpose, the powertrain further comprises transmission and drive shafts. In order to control the operation of the engine, and any related actions such as e.g. power or energy to be drawn from the RESS, the vehicle comprises a control unit or a control system comprising at least one control unit. For example, in a vehicle comprising an electric machine, the control unit may be configured to control the energy and power drawn from the battery pack to the electric machine by an electric machine driver which is configured to control the operation of the electric machine. For RESS comprising a battery pack, the battery pack is normally restricted to be operated within a certain operating window of the state-of-charge, SOC. Thus, all available energy of the battery pack is not made available for usage. However, under certain circumstances, it would be desired to utilize more power or energy of the battery pack than what is allowed according to the restricted operating window. Thus, there is a need in the industry for an improved control of the powertrain, in particular for controlling energy or power utilization of the battery pack.

SUMMARY

According to a first aspect of the disclosure, computer system comprising a processor device is provided. The processor device is configured to:

determine vehicle weight of an electric vehicle and altitude data of a predetermined route of the electric vehicle, determine predictive energy or power utilization of a battery pack of the electric vehicle for the predetermined route, the predictive energy or power utilization being determined by battery pack discharging in response to power consumption of the battery pack along the predetermined route, and battery pack charging in response to power generation of the battery pack along the predetermined route using a regenerative braking system of the electric vehicle together with the vehicle weight and altitude data, identify a vehicle condition along the predetermined route as belonging to a group of predefined vehicle conditions defined as regenerative limiting, the regenerative limiting being defined as vehicle conditions in which charging of the battery pack by the regenerative braking system to its nominally fully charged level occurs somewhere along the predetermined route, the nominally fully charged level being set by the upper limit of an operating window defined by its state-of-charge, SOC, according to default predetermined SOC limits, in response of identifying a vehicle condition as regenerative limiting, operate the battery pack within an operating window defined by extended predetermined SOC limits, the extended predetermined SOC limits having at least one of the upper limit and lower limit exceeding the corresponding limit of the default predetermined SOC limits.

The first aspect of the disclosure may seek to overcome problems relating to determination of available regenerative braking capacity, and providing available charging power during generative braking. A technical benefit may include improved control of charging and discharging of the battery pack of the electric vehicle during travelling along the predetermined route and using the regenerative braking system of the electric vehicle. Thus, by using the weight of the electric vehicle and the altitude data of the predetermined route of the electric vehicle, the predictive energy or power utilization of the battery pack can be determined whereby a predicted, or measured or determined, vehicle condition along the predetermined route can be identified as a regenerative limiting vehicle condition in response to the predictive energy or power utilization, wherein the battery pack of the electric vehicle can be operated by the extended predetermined SOC limits. Stated differently, in response of identifying a vehicle condition as regenerative limiting, the processor device causes, or instructs, the battery pack to operate within the operating window defined by extended predetermined SOC limits. The first aspect of the disclosure may provide an energy management of the battery pack that utilizes vehicle weight and altitude data for determining and providing improved regenerative charging along a predetermined route and within an available SOC range of the battery pack.

A technical benefit of the first aspect of the disclosure, may include that the extended predetermined SOC limits can be utilized in an advantageous manner. That is, as the weight of the electric vehicle and the altitude data of the predetermined route are used as input to determine predicted energy or power utilization of the battery pack for the predetermined route (for example by using an energy of power utilization model), the adapted power availability by the extended predetermined SOC limits of the battery pack can allow for a better usage of the regenerative braking. The predictive energy or power utilization of the battery pack can be evaluated and compared to the default predetermined SOC limits of the battery pack, and if the predictive energy or power utilization of the battery pack, somewhere along the predetermined route, indicates that the nominally fully charged level for the battery pack will be reached (i.e. the upper limit of the default predetermined SOC limits), a vehicle condition defined as regenerative liming is identified. Hereby, the battery pack may be operated within the operating window defined by the extended predetermined SOC limits in order to improve utilization of the regenerative braking system.

By the first aspect of the disclosure, the operation of the battery pack by the extended predetermined SOC limits may be utilized in an efficient manner. Typically, operating the battery pack by the extended predetermined SOC limits implies an increased aging and decreased State-of-Health, SOH, of the battery pack as compared to operating the battery pack by the default predetermined SOC limits. On the other hand, operating the battery pack by the extended predetermined SOC limits implies an increased battery pack utilization (e.g. increased battery pack capacity) as compared to operating the battery pack by the default predetermined SOC limits. Therefore, operating the battery pack by the extended predetermined SOC limits in response of identifying a vehicle condition as regenerative limiting may provide for that the increased battery pack utilization is used in an efficient way.

According to a second aspect of the disclosure, a computer-implemented method is provided.

The method comprises:

determining, by a processor device of a computer system, vehicle weight of an electric vehicle and altitude data of a predetermined route of the electric vehicle, determining, by the processor device, predictive energy or power utilization of a battery pack of the electric vehicle for the predetermined route, the predictive energy or power utilization being determined by battery pack discharging in response to power consumption of the battery pack along the predetermined route, and battery pack charging in response to power generation of the battery pack along the predetermined route using a regenerative braking system of the electric vehicle together with the vehicle weight and altitude data, identifying, by the processor device, a vehicle condition along the predetermined route as belonging to a group of predefined vehicle conditions defined as regenerative limiting, the regenerative limiting being defined as vehicle conditions in which charging of the battery pack by the regenerative braking system to its nominally fully charged level occurs somewhere along the predetermined route, the nominally fully charged level being set by the upper limit of an operating window defined by its state-of-charge, SOC, according to default predetermined SOC limits, in response of identifying a vehicle condition as regenerative limiting, operating, by the processor device, the battery pack within an operating window defined by extended predetermined SOC limits, the extended predetermined SOC limits having at least one of the upper limit and lower limit exceeding the corresponding limit of the default predetermined SOC limits.

The second aspect of the disclosure may seek to solve the same problem as described for the first aspect of the disclosure. Thus, effects and features of the second aspects of the disclosure are largely analogous to those described above in connection with the first aspect of the disclosure. Examples and embodiments mentioned in relation to the first aspect of the disclosure are largely compatible with the second aspect of the disclosure, and vice versa.

In some examples, the method further comprises receiving, by the processor device, data of the vehicle weight from a sensor. The sensor may e.g. be a weight sensor configured to communicate with the processor device. In some examples, the processor device is configured to receive data from stored data comprised in a memory, e.g. a memory of the electric vehicle, or a memory of an external server database, typically in the form of a look-up table. A technical benefit may include usage of reliable data and efficient handling and communication of data.

In some examples, the method further comprises receiving, by the processor device, data of the predetermined route of the electric vehicle from stored data comprised in a memory, e.g. a memory of the electric vehicle, or a memory of an external server database. Such data may be provided as user-input data. For example, the user-input data may include a predetermined destination, and the predetermined route may be determined, by the processor device, using map data and the predetermined destination. A technical benefit may include usage of reliable data and efficient handling and communication of data.

In some examples, the method further comprises receiving, by the processor device, altitude data of the predetermined route from stored data comprised in a memory, e.g. a memory of the electric vehicle, or a memory of an external server database. Alternatively, the processor device is configured to receive topography data (e.g. from map data) of the predetermined route, and determine the altitude data in response of the topography data. A technical benefit may include usage of reliable data and efficient handling and communication of data.

In some examples, the battery pack is comprised in a rechargeable energy storage system, RESS, of the electric vehicle. The battery pack is configured to be operated within at least a first predefined operating window defined by the default predetermined SOC limits, and by at least a second predefined operating window defined by the extended predetermined SOC limits. The RESS may comprise one or several battery packs connected in parallel, and each battery pack typically comprises a plurality of series-connected battery cells. The battery cells may be clustered into battery modules, wherein each battery pack comprises a plurality of series-connected battery modules.

In some examples, the method comprises using, by the processor device, an energy or power utilization model for determining predictive energy or power utilization of the battery pack of the electric vehicle for the predetermined route. A technical benefit may include efficient determination of energy or power utilization of the battery pack, or efficient identification of a regenerative limiting vehicle condition. The energy or power utilization model typically uses the vehicle weight and altitude data of the predetermined route as input data, and provides output data in the form of predictive energy or power utilization of the battery pack for the predetermined route, or output data in the form of identification of a vehicle condition as regenerative limiting along the predetermined route. The predictive energy or power utilization of the battery pack of the electric vehicle for the predetermined route may be determined by using the default predetermined SOC limits of the battery pack. Thus, the energy or power utilization model may use the default predetermined SOC limits of the battery pack for determining the predictive energy or power utilization of the battery pack.

In some examples, the method further comprises identifying, by the processor device, a vehicle condition along the predetermined route as belonging to a group of predefined vehicle conditions defined as non-regenerative limiting, the non-regenerative limiting being defined as vehicle conditions in which charging of the battery pack by the regenerative braking system to its nominally fully charged level do not occur along the predetermined route. A technical benefit may include efficient distinguishing between vehicle conditions being regenerative limiting and non-regenerative limiting. For example, identifying a vehicle condition as non-regenerative limiting implies that charging of the battery pack by the regenerative braking system to its nominally fully charged level do not occur anywhere along the predetermined route. The group of predefined vehicle conditions defined as regenerative limiting and non-regenerative limiting may e.g. be stored in the previously mentioned memory, e.g. in the form of a look-up table.

In some examples, the method further comprises, in response of identifying the vehicle condition as non-regenerative limiting along the predetermined route, operating, by the processor device, the battery pack within an operating window defined by the default predetermined SOC limits. A technical benefit may include efficient operation of the battery pack along the predetermined route. Thus, according to such examples, the battery pack is operated by extended predetermined SOC limits in response to identifying a vehicle condition along the predetermined route as regenerative limiting, otherwise, the battery pack is operated by the default predetermined SOC limits. In other words, the processor device causes the battery pack to be operated within the operating window defined by the default or extended predetermined SOC limits.

It should be understood that the operation window of the battery pack according to extended predetermined SOC limits or default predetermined SOC limits may be set, by the processor device, in advance to the electric vehicle driving the predetermined route. For example, the battery pack may be set to be operated according to the extended predetermined SOC limits, or according to the default predetermined SOC limits, along the whole predetermined route. In other words, the operating window of the battery pack may be set, by the processor device, to be fixed along the predetermined route. As an alternative, the operating window of the battery pack may be set, by the processor device, according to the extended predetermined SOC limits only along the portion, or segment, of the predetermined route for which the vehicle condition is identified as being regenerative limiting. However, such setting of the operating window, by the processor device, may be achieved in advance to the electric vehicle driving the predetermined route.

In some examples, the method further comprises predicting, by the processor device, one or more vehicle conditions along the predetermined route using the predictive energy or power utilization of the battery pack of the electric vehicle for the predetermined route, wherein the identified vehicle condition is comprised in the one or more predicted vehicle conditions. A technical benefit may include improved identification of a predicted vehicle condition as regenerative limiting along the predetermined route, i.e. improved identification of a vehicle condition as regenerative limiting in advance to the electric vehicle driving the predetermined route. Correspondingly, identification of a predicted vehicle condition as non-regenerative limiting along the predetermined route may be performed in advance to the electric vehicle driving the predetermined route. Thus, the operating window of the battery pack according to extended predetermined SOC limits or default predetermined SOC limits may be set, by the processor device, in response to identifying a predicted vehicle condition as regenerative limiting or non-regenerative limiting.

In some examples, the predetermined route is segmentized, e.g. by the processor device, wherein each predefined segment of the predetermined route corresponds to a predicted vehicle condition. In such example, in response to that all predicted vehicle conditions for all predefined segments of the predetermined route are identified as non-regenerative limiting (i.e. charging of the battery pack by the regenerative braking system to its nominally fully charged level do not occur along the predetermined route), the battery pack is operated by the default predetermined SOC limits. Correspondingly, in response to that at least one of the predicted vehicle conditions for all predefined segments of the predetermined route is identified as regenerative limiting (i.e. charging of the battery pack by the regenerative braking system to its nominally fully charged level occurs somewhere along the predetermined route), the battery pack is operated by the extended predetermined SOC limits, at least along the predefined segment corresponding to the predicted vehicle condition identified as regenerative limiting, or along all predefined segments of the predetermined route.

In some examples, the method further comprises determining, by the processor device, predicted vehicle operational information, wherein the predicted energy or power utilization of the battery pack is determined using the predicted vehicle operational information. A technical benefit may include improved determination or prediction of the energy or power utilization of the battery pack along the predetermined route. The predicted vehicle operational information may comprise predicted operational load of the battery pack during the predicted vehicle operation of the electric vehicle. The predicted operational load of the battery pack is typically correlated to the altitude data. The predicted vehicle operational information may comprise predicted initialization time of operating the electric vehicle. In some examples, the predicted vehicle operational information comprises predicted operational load of the battery pack over time and along the predetermined route, such as e.g. during a drive cycle or a work/load cycle of the electric vehicle. Thus, the operating window of the battery pack may be set in accordance with, or in response to, the predicted operational load of the battery pack along the predetermined route. The predicted vehicle operational information, or the predicted operational load of the battery pack, may be used as input data in the previously mentioned energy or power utilization model.

In some examples, the battery regeneration (as work in units Joule) is calculated using equation 1:

$$\text{Altitude change (m)} * \text{vehicle weight} \tag{1}$$
$$(\text{kg}) * 9.81 \, (\text{m/s2}) * \text{regeneration efficiency}$$

The altitude change is thus determined by the altitude data of the predetermined route. The vehicle weight may be referred to as the mass of the vehicle and the regeneration efficiency of the vehicle is generally predetermined. Equation 1 can easily be transformed into the unit power (J/s) by applying it over a time interval.

In some examples, the method further comprises using, by the processor device, predicted vehicle operational information comprising historical or statistical data of the vehicle operation. A technical benefit may include improved prediction of the energy or power utilization of the battery pack along the predetermined route. Thus, the predictive energy or power utilization of the battery pack for the specific vehicle weight and altitude data of the predetermined route may be compared to corresponding predictive energy or power utilization of historical or statistical data of the vehicle operation.

In some examples, the method further comprises using, by the processor device, vehicle operational information comprising scheduled vehicle operational information for the predetermined route. A technical benefit may include improved prediction of the energy or power utilization of the battery pack along the predetermined route.

Thus, various types of the vehicle information can be used as input data, by the processor device, to determine the predicted vehicle operational information. That is, historical or statistical data of the vehicle operation may be used as input data to determine the predicted vehicle operational information, or pre-determined planned vehicle operation may be used as input to determine, by the processor device, scheduled vehicle operational information. Stated differently, the predicted vehicle operational information may be determined in response to historical or statistical data of the vehicle operation, or may be scheduled vehicle operational information determined in response to predetermined planned vehicle operation. For example, the historical time-span which the electric vehicle is operated, and/or the historical week-days which the electric vehicle is operated e.g. related to the historical vehicle route, may be statistically used as input data, by the processor device, to the predicted vehicle operational information.

In some examples, the method further comprises comparing, by the processor device, the predicted energy or power utilization of the battery pack for the predetermined route with a preset threshold, wherein predicted energy or power utilization above the preset threshold somewhere along the predetermined route is defined to correspond to a vehicle condition belonging to the group of predefined vehicle conditions defined as regenerative limiting. A technical benefit may include improved identification of regenerative limiting vehicle conditions. The preset threshold may e.g. be set to correspond to the upper limit of the default predetermined SOC limits. In some examples, predicted energy or power utilization below the preset threshold along the whole predetermined route may be defined to correspond to vehicle condition(s) belonging to the group of predefined vehicle conditions defined as non-regenerative limiting.

In some examples, the preset threshold is corresponding to a predicted energy or power utilization which is limiting for the upper limit of the default predetermined SOC limits. A technical benefit may include improved identification of regenerative limiting vehicle conditions.

In some examples, the default predetermined SOC limits extend from a lower default SOC limit having a SOC-value between 15% and 30%, to an upper default SOC limit having a SOC-value between 65% and 85%. A technical benefit may include well defined and delimiting default predetermined SOC limits. It should be understood that the SOC of the battery pack is defined to extend from 0% to 100%, in which 0% defines an empty battery pack and 100% defines a fully charged battery pack. Thus, SOC defines the level of charge of the battery pack relative to its capacity. Thus, the lower limit of 0% and the upper limit of 100% may be defined as the absolute SOC limits of the battery pack. By providing a battery pack which is configured to be operated within a predefined operating window defined by its state-of-charge, SOC according to default (or normal) predetermined SOC limits, the default predetermined SOC limits being set stricter than the absolute SOC limits, the battery pack is protected from unnecessary wear and other related problems. Thus, during typical driving of the electric vehicle, the battery pack is typically not allowed to violate the default predetermined SOC limits.

In some examples, the extended predetermined SOC limits extend from a lower extended SOC limit having a SOC-value between 5% and 30%, to an upper extended SOC limit having a SOC-value between 65% and 95%. A technical benefit may include well defined and delimiting extended predetermined SOC limits. By providing a battery pack which is configured to be operated within a predefined operating window defined by its state-of-charge, SOC according to extended predetermined SOC limits, the extended predetermined SOC limits being set stricter than the absolute SOC limits, the battery pack is protected from unnecessary wear and other related problems. Moreover, by that at least one of the upper limit and lower limit of the extended predetermined SOC limits exceeds the corresponding limit of the default predetermined SOC limits (i.e. either that the lower limit of the extended predetermined SOC limits is lower than the lower limit of the default predetermined SOC limits, or that the upper limit of the extended predetermined SOC limits is higher than the upper limit of the default predetermined SOC limits), increased utilization of the battery pack can be applied when needed. Instead of stating that at least one of the upper limit and lower limit of the extended predetermined SOC limits exceeds the corresponding limit of the default predetermined SOC limits, it could be stated that at least one of the upper limit and lower limit of the extended predetermined SOC limits is set beyond, or is set less strict than, the corresponding limit of the default predetermined SOC limits. Thus, the operating window defined by the extended predetermined SOC limits is wider than the operating window defined by the default predetermined SOC limits. For example, the battery pack is capable of attaining a higher energy or power utilization when operating in an operating window defined by the extended predetermined SOC limits as compared to when operating in an operating window defined by the default predetermined SOC limits. It should be noted, for examples in which the lower SOC limit of the extended predetermined SOC limits is lower than the lower SOC limit of the default predetermined SOC limits (but the upper limit of the extended predetermined SOC limits may be the same, or higher, than the upper limit of the default predetermined SOC limits) operation of the battery pack by the extended predetermined SOC limits allows for the battery pack to be further discharged compared to if the battery pack was operated according to default predetermined SOC limits. As the battery pack may be discharged to a lower SOC level, more power may be charged to the battery by regenerative braking in a subsequent downhill of the predetermined route, and thus, regenerative charging of the battery pack may be improved (and a regenerative vehicle condition even avoided).

In some examples, operating, by the processor device, the battery pack by default predetermined SOC limits includes prohibiting concurrent operation of the battery pack by extended predetermined SOC limits. In other words, when prevailing conditions and/or criteria are controlling the operation of the battery pack within the operating window defined by default predetermined SOC limits, operation of the battery pack within the operating window defined by extended predetermined SOC limits is prohibited (obviously only until prevailing conditions and/or criteria for operating the battery pack by extended predetermined SOC limits are fulfilled). Thus, in response of identifying a vehicle condition as regenerative limiting, the method may comprise changing the operating window, by the processor device, of the battery pack of the electric vehicle from the operating window defined by default predetermined SOC limits to the operating window defined by extended predetermined SOC limits.

According to a third aspect of the disclosure, a vehicle comprising the processor to perform the method of the second aspect of the disclosure is provided. The processor may e.g. be that of the first aspect of the disclosure. The vehicle is typically an electric vehicle as previously described.

According to a fourth aspect of the disclosure, a computer program product comprising program code for performing, when executed by the processor device, the method of the second aspect of the disclosure is provided.

According to a fifth aspect of the disclosure, a control system comprising one or more control units configured to perform the method of the second aspect of the disclosure is provided.

According to a sixth aspect of the disclosure, a non-transitory computer-readable storage medium comprising instructions, which when executed by the processor device, cause the processor device to perform the method of the second aspect of the disclosure is provided.

The third to sixth aspects of the disclosure may seek to solve the same problem as described for the first and second aspects of the disclosure. Thus, effects and features of the third to sixth aspects of the disclosure are largely analogous to those described above in connection with the first and second aspects of the disclosure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure. The object of the present inventive concept is to solve the problem with unsatisfactory utilization of power and/or energy of the battery pack during travelling of the electric vehicle along a predetermined route, and to provide an improved control of the energy or power utilization of the battery pack. The inventive concept solves the problem by, inter alia, identifying a vehicle condition along the predetermined route as belonging to a group of predefined vehicle conditions defined as regenerative limiting, and in response of identifying such regenerative limiting vehicle condition, operate the battery pack within an operating window defined by extended predetermined SOC limits, the extended predetermined SOC limits having at least one of the upper limit and lower limit exceeding the corresponding limit of the default predetermined SOC limits.

Figure 1:
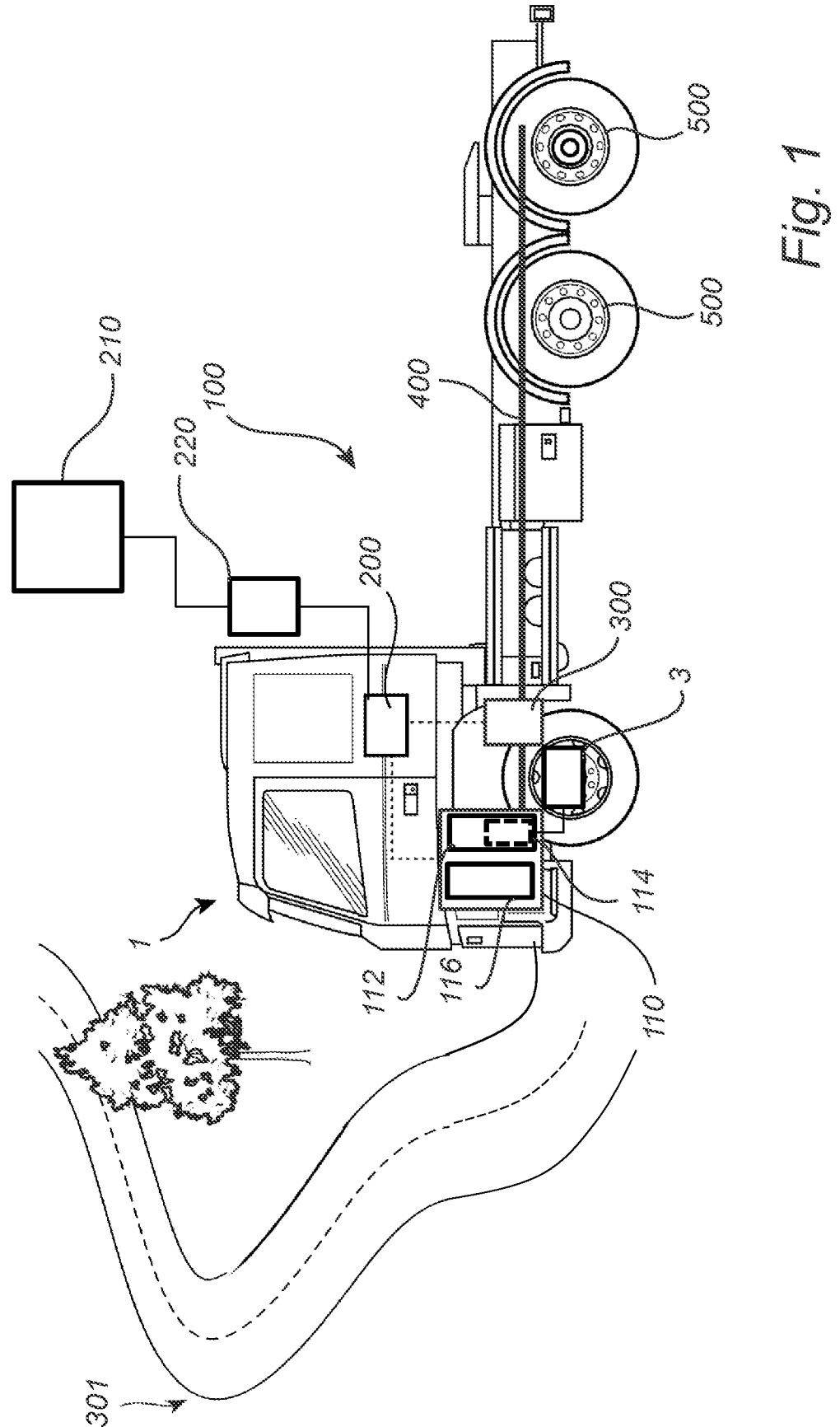
FIG. 1 is an exemplary, partly schematic, side view of an electric vehicle comprising a powertrain with a battery pack in a rechargeable energy storage system, RESS, and a control unit according to one example.

FIG. 1 shows an exemplary heavy duty truck 1, and a predetermined route 301 for the truck 1 to drive. The truck 1 is an electric vehicle, such as a full electric vehicle or a hybrid, comprising a powertrain 100 having an electric driveline 110 comprising a rechargeable energy storage system, RESS, 112 including at least one battery pack 114, and a at least one electric machine 116 powered by the battery pack 114. As seen in FIG. 1, the powertrain 100 may further comprise a transmission 300 comprising at least a gearbox, and drive shafts 400 configured to transfer motion to the drive wheels 500.

The truck 1 typically comprises a regenerative braking system 3 of a known type. The regenerative braking system generally comprises a kinetic energy recovery system configured to transfer kinetic energy of an object in motion, i.e. the truck 1, into stored energy, i.e. charging of the battery pack 114, to slow the truck 1 down. For example, the regenerative braking system comprises an electric generator, which preferably is the same component as the previously mentioned electric machine. Thus, the energy produced when slowing the truck 1 down, typically by braking, is stored chemically in the battery pack (i.e. regenerative charging of the battery pack 114, or simply battery regeneration). The battery regeneration of the regenerative braking system is associated with a regeneration efficiency, i.e. how efficient the energy produced when slowing the truck 1 down is stored in the battery pack 114.

The battery pack 114 is configured to be operated within an operating window defined by its state-of-charge, SOC, according to default predetermined SOC limits and extended predetermined SOC limits. For the extended predetermined SOC limits, at least one of the upper limit and lower limit exceeds the corresponding limit of the default predetermined SOC limits. This is shown in more detail in the graph of FIG. 2.

The truck 1 further comprises control unit 200 configured to communicate with the RESS 112 and the batter pack 114. For example, the control unit 200 is configured to set the SOC operation window of the battery pack 114 according to default predetermined SOC limits or extended predetermined SOC limits, i.e. to operate the battery pack 114 according to default predetermined SOC limits or extended predetermined SOC limits. The control unit 200 is configured to communicate with a memory 210, e.g. a memory of the truck 1, or a memory of an external server database, and receive data 220 from the memory 210, as is described in detail with reference to FIG. 4. The memory 210 may form part of the control unit 200, or control system thereof.

Figure 2:
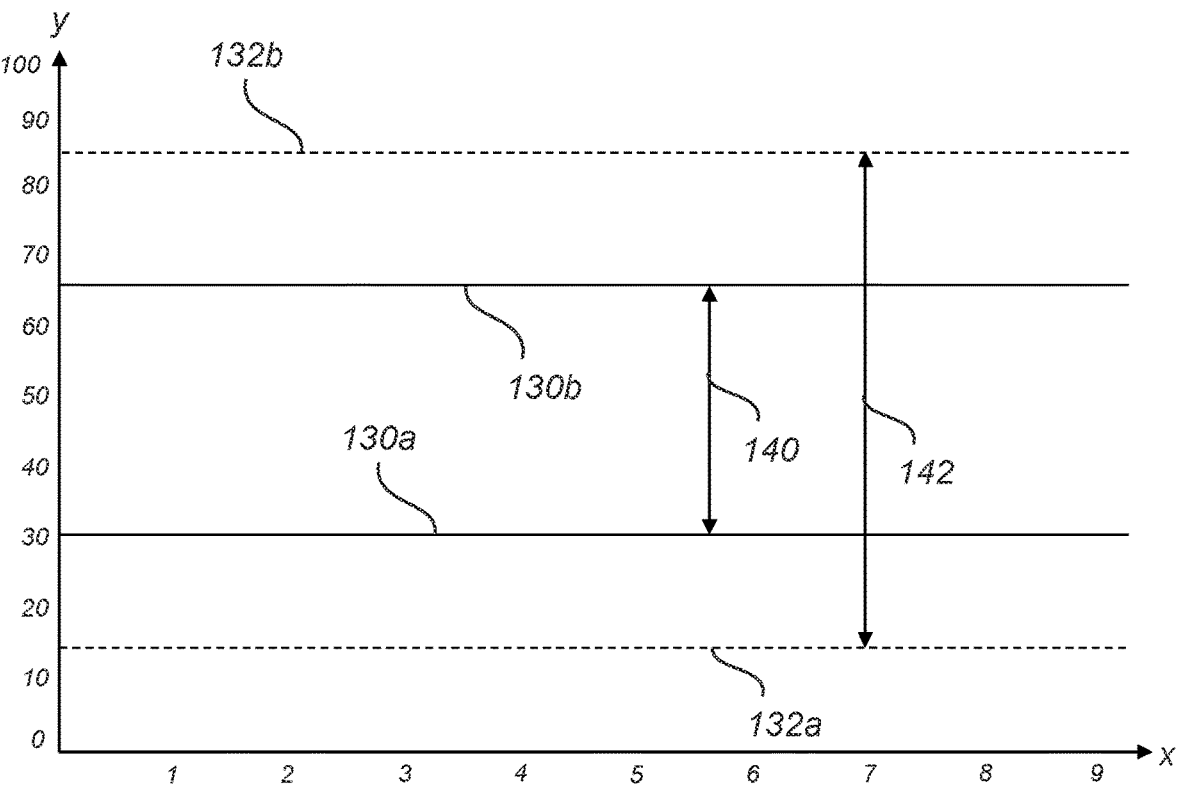
FIG. 2 is a graph showing default and extended predetermined SOC limits of a battery pack according to one example.

In the graph of FIG. 2, the y-axis represents the SOC of the battery pack defined by the absolute SOC-limits of which 0% defines an empty battery pack and 100% defines a fully charged battery pack, and the x-axis represents time (in units of e.g. minutes). Moreover, in the graph of FIG. 2, default predetermined SOC limits 130a, 130b are defined to extend from a lower default SOC limit 130a having a SOC-value of 30%, to an upper default SOC limit 130b having a SOC-value of 65%. The operating window 140 of the battery pack in accordance with the default predetermined SOC limits 130a, 130b is symbolized by a first double ended arrow 140. Thus, the battery pack is configured to be operated within the predefined operating window 140 according to the default predetermined SOC limits 130a, 130b.

In the graph of FIG. 2, extended predetermined SOC limits 132a, 132b are defined to extend from a lower extended SOC limit 132a having a SOC-value of 15%, to an upper extended SOC limit 132b having a SOC-value of 85%. The operating window 142 of the battery pack in accordance with the extended predetermined SOC limits 132a, 132b is symbolized by a second double ended arrow 142. Thus, the battery pack is configured to be operated within the predefined operating window 142 according to the extended predetermined SOC limits 132a, 132b. It should be noted that in the graph of FIG. 2, the lower and upper default SOC limits 130a, 130b are both set stricter than the corresponding lower and upper extended SOC limits 132a, 132b (i.e. the lower default SOC limit 130a is less low than the lower extended SOC limit 132a, and the upper default SOC limit 130b is less high than the upper extended SOC limit 132b). However, according to at least one example, only one of the lower and upper default predetermined SOC limits 130a, 130b is set stricter than the corresponding lower and upper extended SOC predetermined limits 132a, 132b (i.e. either the lower default SOC limit 130a is set to be less low than the lower extended predetermined SOC limit 132a, or the upper default SOC limit 130b is set to be less high than the upper extended SOC limit 132b). For simplicity, the SOC-values of the default predetermined SOC limits 130a, 130b and the extended predetermined SOC limits 132a, 132b are straight lines in FIG. 2, and are thus shown to be constant over the given time period (but they may alternatively vary over the given time period).

Figure 3:
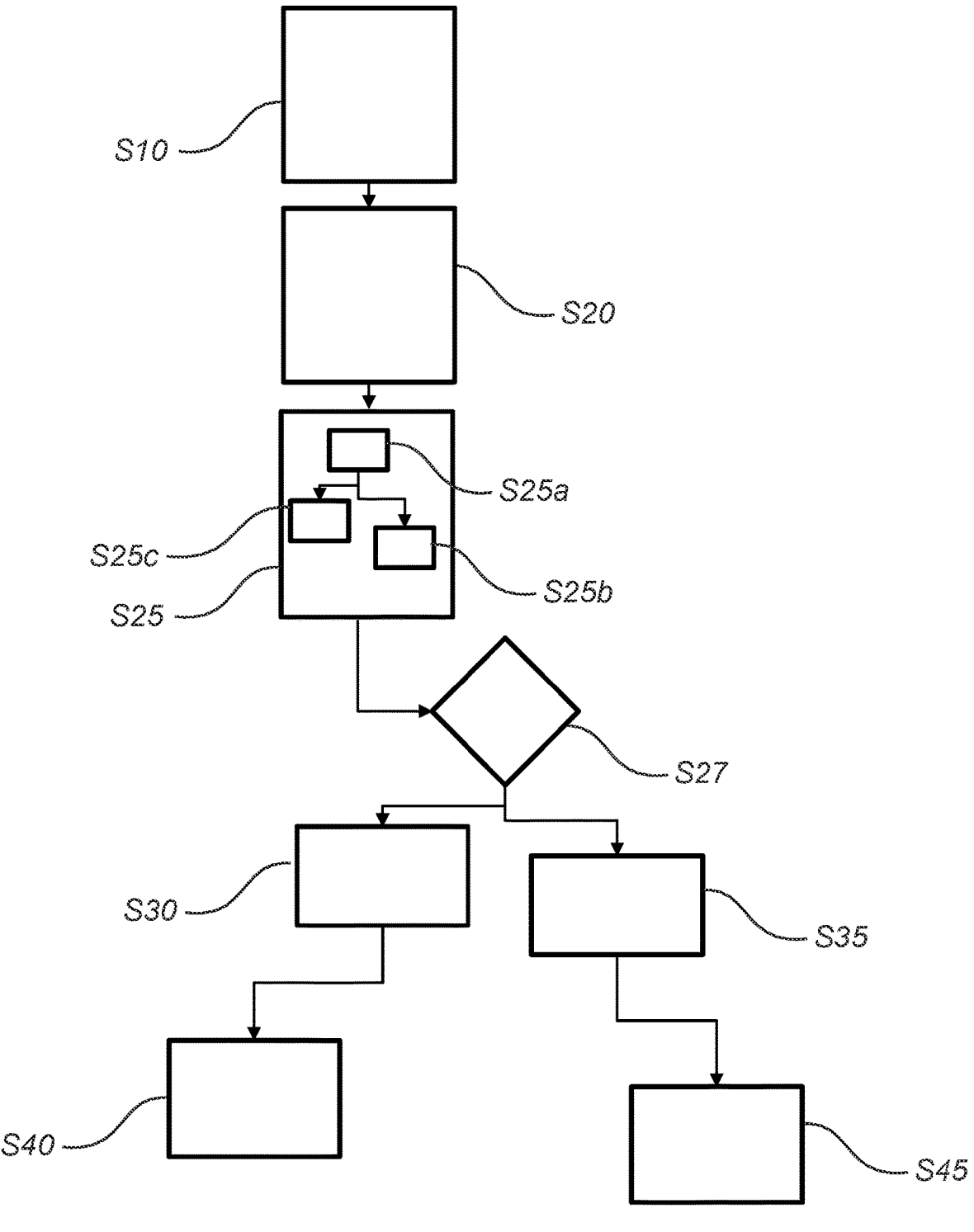
FIG. 3 is a flowchart illustrating the steps of a method in according to one example.

FIG. 3 is a flow chart of a computer implemented method for controlling energy or power utilization of a battery pack in a rechargeable energy storage system, RESS, of a vehicle, such as battery pack 114 of RESS 112 of truck 1 in FIG. 1, according to one example. The energy or power utilization of the battery pack is controlled by setting the operating window defined by its state-of-charge, SOC.

In a step S10, e.g. being a first step S10, vehicle weight of an electric vehicle and altitude data of a predetermined route of the electric vehicle, is determined by a processor device of a computer system. For example, and with reference to FIG. 1, the processor device may be comprised in the control unit 200 of the truck 1, and the vehicle weight and the altitude data may be comprised in the data 220 received by the control unit 200 from the memory 210. The predetermined route 301 may be included in the data 200, e.g. as a scheduled or planned route of the truck 1.

In a step S20, e.g. being a second step S20, predictive energy or power utilization of a battery pack of the electric vehicle for the predetermined route is determined by the processor device. The predictive energy or power utilization is determined by predicting battery pack discharging in response to power consumption of the battery pack along the predetermined route, and battery pack charging in response to power generation of the battery pack along the predetermined route using a regenerative braking system of the electric vehicle together with the vehicle weight and altitude data, from the first step S10. The processor device may determine the predictive energy or power utilization of the battery pack using an energy of power utilization model of the battery pack, typically correlating power consumption and power generation to the operation of the electric vehicle along the predetermined route.

In a step S30, e.g. being a third step S30, a vehicle condition is identified, by the processor device, along the predetermined route as belonging to a group of predefined vehicle conditions defined as regenerative limiting. The regenerative limiting vehicle conditions are defined as vehicle conditions in which charging of the battery pack by the regenerative braking system to its nominally fully charged level occurs somewhere along the predetermined route, the nominally fully charged level being set by the upper limit of the predefined operating window according to default predetermined SOC limits. The default predetermined SOC limits may e.g. extend from a lower default SOC limit having a SOC-value between 15% and 30%, to an upper default SOC limit having a SOC-value between 65% and 85%, and the extended predetermined SOC limits extend from a lower extended SOC limit having a SOC-value between 5% and 30%, to an upper extended SOC limit having a SOC-value between 65% and 95%.

In a step S40, e.g. being a fourth step S40, in response of identifying a vehicle condition as regenerative limiting, the battery pack is operated, by the processor device, within an operating window defined by the extended predetermined SOC limits. As previously described, the extended predetermined SOC limits have at least one of the upper limit and lower limit exceeding the corresponding limit of the default predetermined SOC limits. Thus, the processor device may set the operating window of the battery pack.

In an optional step S35, e.g. carried out in parallel to step S30, a vehicle condition is identified, by the processor device, along the predetermined route as belonging to a group of predefined vehicle conditions defined as non-regenerative limiting. The non-regenerative limiting vehicle conditions are defined as vehicle conditions in which charging of the battery pack by the regenerative braking system to its nominally fully charged level do not occur along the predetermined route.

In an optional step S45, e.g. carried out prior to, or subsequent to the fourth step S40, typically for another predetermined route than that of step S40, in response of identifying the vehicle condition as non-regenerative limiting along the predetermined route in step S35, the battery pack is operated, by the processor device, within an operating window defined by the default predetermined SOC limits.

In an optional step S25, performed prior to at least step S30, one or more vehicle conditions is predicted, by the processor device, along the predetermined route using the predictive energy or power utilization of the battery pack of the electric vehicle for the predetermined route. Thus, if any one of the predicted vehicle conditions along the predetermined route is determined, by the processor device, to fall within the definition of regenerative limiting, such regenerative limiting predictive vehicle condition is identified for the predetermined route. Correspondingly, if the one, or all of, the predicted vehicle conditions along the predetermined route is/are determined, by the processor device, to fall within the definition of non-regenerative limiting, such non-regenerative limiting predictive vehicle condition is identified wherein the identified for the predetermined route. That is, the regenerative limiting, and the non-regenerative limiting, vehicle conditions are comprised in (or makes up) the predicted vehicle conditions.

In an optional sub-step to step S25, predicted vehicle operational information is determined by the processor device. For example, with reference to FIG. 1, the data 220 received from the memory 210 may comprise such predicted vehicle operational information. The step S25 of predicting one or more vehicle conditions may be performed by the step S25*a* of using, by the processor device, the predicted vehicle operational information.

The vehicle operational information may comprise historical or statistical data of the vehicle operation. The vehicle operational information may comprise scheduled vehicle operational information for the predetermined route. For example, with reference to FIG. 1, the data 220 received from the memory or data server 210 may comprise such historical or statistical data of the vehicle operation or scheduled vehicle operational information for the predetermined route. The step S25 of predicting one or more vehicle conditions may be performed by the step S25*b* of using, by the processor device, historical or statistical data of the vehicle operation. The step S25 of predicting one or more vehicle conditions may be performed by the step S25*c* of using, by the processor device, scheduled vehicle operational information for the predetermined route.

In an optional sub-step to step S25, predicted vehicle operational information is, by the processor device determined. For example, with reference to FIG. 1, the data 220 received from the memory or data server 210 may comprise such perceived vehicle operational information. The step S25 of predicting one or more vehicle conditions may be performed by the step S25*a* of using, by the processor device, the predicted vehicle operational information.

In the flow chart of FIG. 3, the two steps S30, S35 of identifying vehicle conditions as either regenerative limiting or non-regenerative limiting is shown as a result of a separated decision making step S27. Thus, depending on the outcome of the decision making step S27, the operation of the battery pack is either in accordance with step S40 or in accordance with step S45. The decision making step S27 may e.g. comprise comparing, by the processor device, the predicted energy or power utilization of the battery pack for the predetermined route with a preset threshold. The method may furthermore comprise defining a vehicle condition as belonging to the group of predefined vehicle conditions as regenerative limiting in response to a predicted energy or power utilization being above the preset threshold somewhere along the predetermined route. Correspondingly, the method may comprise defining a vehicle condition as belonging to the group of predefined vehicle conditions as non-regenerative limiting in response to a predicted energy or power utilization being below the preset threshold along the predetermined route. The preset threshold may for example correspond to a predicted energy or power utilization which is limiting for the upper limit of the default predetermined SOC limits.

The controlling apparatus 200 of FIG. 1 may be configured to perform the method as described with reference to FIG. 3. The method as described with reference to FIG. 3 may thus be implemented in a computer program product comprising program code for performing, when executed by the processor device, the method described with reference to FIG. 3. Alternatively the method as described with reference to FIG. 3 may be implemented in a non-transitory computer-readable storage medium comprising instructions, which when executed by the processor device, cause the processor device to perform the method as described with reference to FIG. 3. Thus, the control unit 200 may comprise instructions to cause the powertrain 100 (e.g. the battery pack 114) to be operated according to at least some of the steps described with reference to FIG. 3. The control unit 200 of the truck

1 of FIG. 1 may constitute, or be comprised in, a control system comprising one or more control units configured to perform the method as described with reference to FIG. 3. Such control system 1000 is described with reference to FIG. 4.

Figure 4:
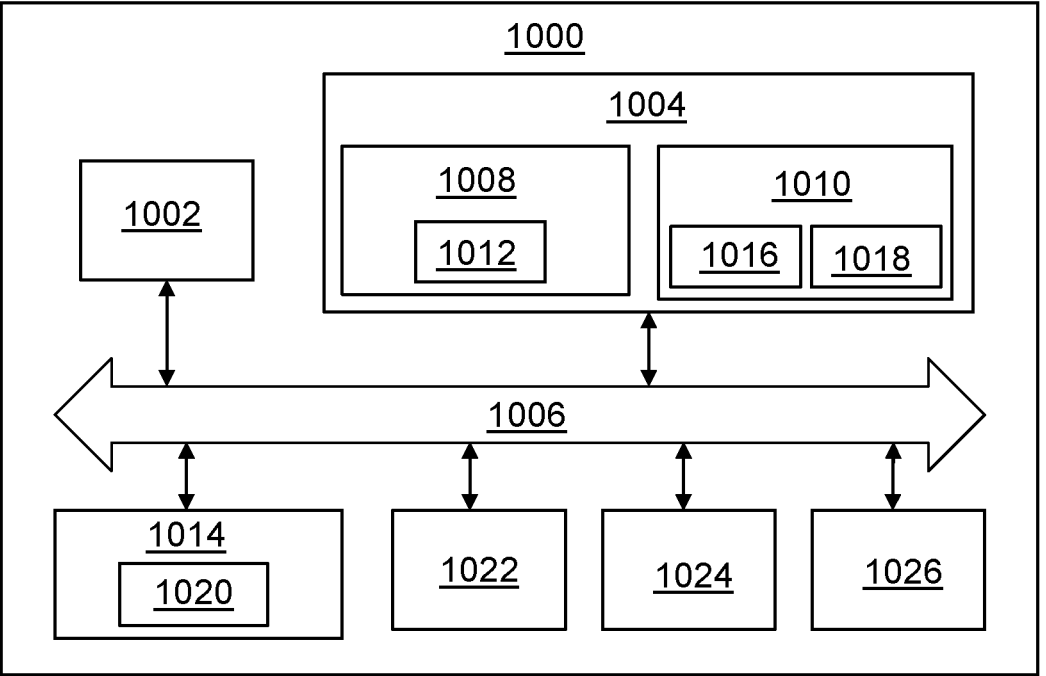
FIG. 4 is a schematic diagram of an exemplary computer system for implementing examples disclosed herein, according to one example.

FIG. 4 is a schematic diagram of a computer system 1000 for implementing examples disclosed herein, e.g. the method as described with reference to FIG. 3. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include a processor device 1002 (may also be referred to as a control unit), a memory 1004, and a system bus 1006. The computer system 1000 may include at least one computing device having the processor device 1002. The system bus 1006 provides an interface for system components including, but not limited to, the memory 1004 and the processor device 1002. The processor device 1002 may include any number of hardware components for conducting data or signal processing or for executing computer code stored in memory 1004. The processor device 1002 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processor device 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with a processor device 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program product 1020 stored on a transitory or non-transitory computer-usable or computer-readable storage medium (e.g., single medium or multiple media), such as the storage device 1014, which includes complex programming instructions (e.g., complex computer-readable program code) to cause the processor device 1002 to carry out the steps described herein. Thus, the computer-readable program code can comprise software instructions for implementing the functionality of the examples described herein when executed by the processor device 1002. The processor device 1002 may serve as a controller or control system for the computer system 1000 that is to implement the functionality described herein.

The computer system 1000 also may include an input device interface 1022 (e.g., input device interface and/or output device interface). The input device interface 1022 may be configured to receive input and selections to be communicated to the computer system 1000 when executing instructions, such as from a keyboard, mouse, touch-sensitive surface, etc. Such input devices may be connected to the processor device 1002 through the input device interface 1022 coupled to the system bus 1006 but can be connected through other interfaces such as a parallel port, an Institute of Electrical and Electronic Engineers (IEEE) 1394 serial port, a Universal Serial Bus (USB) port, an IR interface, and the like. The computer system 10100 may include an output device interface 1024 configured to forward output, such as to a display, a video display unit (e.g., a liquid crystal display (LCD) or a cathode ray tube (CRT)). The computer system

1000 may also include a communications interface 1026 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence. Thus, it should be noted that the naming of the steps not necessarily, but might according to at least one example, relate to the order in which the steps are carried out.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to:

determine vehicle weight of an electric vehicle and altitude data of a predetermined route of the electric vehicle, determine predictive energy or power utilization of a battery pack of the electric vehicle for the predetermined route, the predictive energy or power utilization being determined by battery pack discharging in response to power consumption of the battery pack along the predetermined route, and battery pack charging in response to power generation of the battery pack along the predetermined route using a regenerative braking system of the electric vehicle together with the vehicle weight and altitude data, identify a vehicle condition along the predetermined route as belonging to a group of predefined vehicle conditions defined as regenerative limiting, the regenerative limiting being defined as vehicle conditions in which charging of the battery pack by the regenerative braking system to its nominally fully charged level occurs somewhere along the predetermined route, the nominally fully charged level being set by the upper limit of an operating window defined by its state-of-charge, SOC, according to default predetermined SOC limits, in response of identifying a vehicle condition as regenerative limiting, operate the battery pack within an operating window defined by extended predetermined SOC limits, the extended predetermined SOC limits having at least one of the upper limit and lower limit exceeding the corresponding limit of the default predetermined SOC limits.

2. A computer-implemented method, comprising:

determining, by a processor device of a computer system, vehicle weight of an electric vehicle and altitude data of a predetermined route of the electric vehicle, determining, by the processor device, predictive energy or power utilization of a battery pack of the electric vehicle for the predetermined route, the predictive energy or power utilization being determined by battery pack discharging in response to power consumption of the battery pack along the predetermined route, and battery pack charging in response to power generation of the battery pack along the predetermined route using a regenerative braking system of the electric vehicle together with the vehicle weight and altitude data, identifying, by the processor device, a vehicle condition along the predetermined route as belonging to a group of predefined vehicle conditions defined as regenerative limiting, the regenerative limiting being defined as vehicle conditions in which charging of the battery pack by the regenerative braking system to its nominally fully charged level occurs somewhere along the predetermined route, the nominally fully charged level being set by the upper limit of an operating window defined by its state-of-charge, SOC, according to default predetermined SOC limits, in response of identifying a vehicle condition as regenerative limiting, operating, by the processor device, the battery pack within an operating window defined by extended predetermined SOC limits, the extended predetermined SOC limits having at least one of the upper limit and lower limit exceeding the corresponding limit of the default predetermined SOC limits.

3. The method of claim 2, further comprising:

identifying, by the processor device, a vehicle condition along the predetermined route as belonging to a group of predefined vehicle conditions defined as non-regenerative limiting, the non-regenerative limiting being defined as vehicle conditions in which charging of the battery pack by the regenerative braking system to its nominally fully charged level do not occur along the predetermined route.

4. The method of claim 2, further comprising:

in response of identifying the vehicle condition as non-regenerative limiting along the predetermined route, operating, by the processor device, the battery pack within an operating window defined by the default predetermined SOC limits.

5. The method of claim 2, further comprising:

predicting, by the processor device, one or more vehicle conditions along the predetermined route using the predictive energy or power utilization of the battery pack of the electric vehicle for the predetermined route, wherein the identified vehicle condition is comprised in the one or more predicted vehicle conditions.

6. The method of claim 2, further comprising:

determining, by the processor device, predicted vehicle operational information, wherein the predicted energy or power utilization of the battery pack is determined using the predicted vehicle operational information.

7. The method of claim 6, further comprising:

using, by the processor device, predicted vehicle operational information comprising historical or statistical data of the vehicle operation.

8. The method of claim 6, further comprising: using, by the processor device, vehicle operational information comprising scheduled vehicle operational information for the predetermined route.

9. The method of claim 2, further comprising:

comparing, by the processor device, the predicted energy or power utilization of the battery pack for the predetermined route with a preset threshold, wherein a predicted energy or power utilization above the preset threshold somewhere along the predetermined route is defined to correspond to a vehicle condition belonging to the group of predefined vehicle conditions defined as regenerative limiting.

10. The method of claim 9, wherein the preset threshold is corresponding to a predicted energy or power utilization which is limiting for the upper limit of the default predetermined SOC limits.

11. The method of claim 2, wherein the default predetermined SOC limits extend from a lower default SOC limit having a SOC-value between 15% and 30%, to an upper default SOC limit having a SOC-value between 65% and 85%.

12. The method of claim 2, wherein the extended predetermined SOC limits extend from a lower extended SOC limit having a SOC-value between 5% and 30%, to a upper extended SOC limit having a SOC-value between 65% and 95%.

13. A vehicle comprising the processor device to perform the method of claim 2.

14. A computer program product comprising program code for performing, when executed by the processor device, the method of claim 2.

15. A control system comprising one or more control units configured to perform the method of claim 2.

16. A non-transitory computer-readable storage medium comprising instructions, which when executed by the processor device, cause the processor device to perform the method of claim 2.

\* \* \* \* \*